Sept. 21, 1926.
R. R. MUNDELL
TIRE CONSTRUCTION
Filed May 21, 1924  2 Sheets-Sheet 1
1,600,694
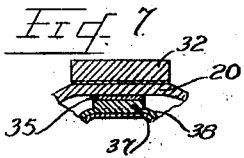
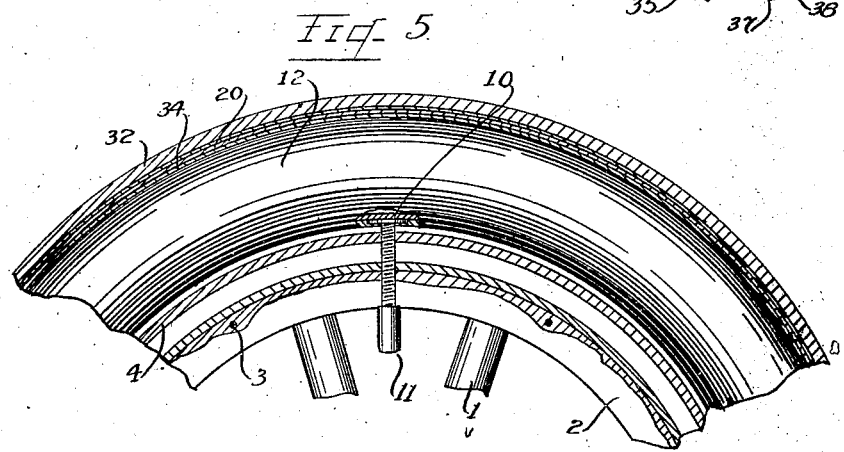
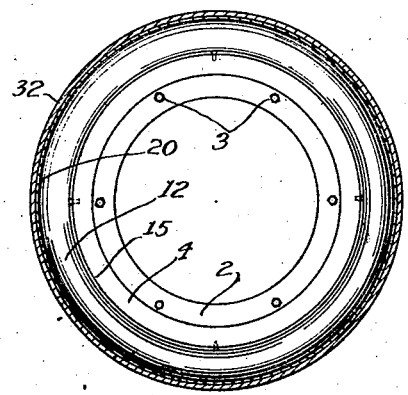
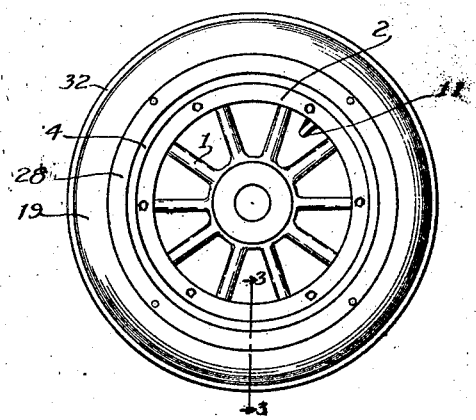
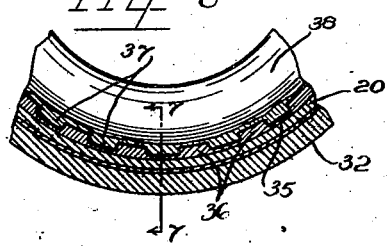
Inventor
Ralph Rogers Mundell
by
Attys.

Sept. 21, 1926.
R. R. MUNDELL
TIRE CONSTRUCTION
Filed May 21, 1924
1,600,694
2 Sheets-Sheet 2
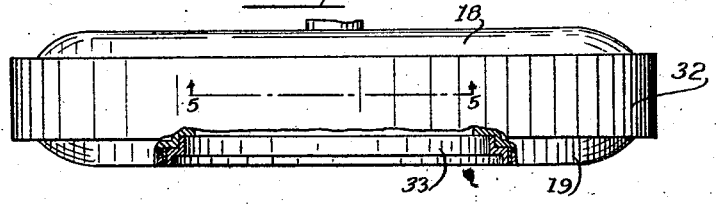
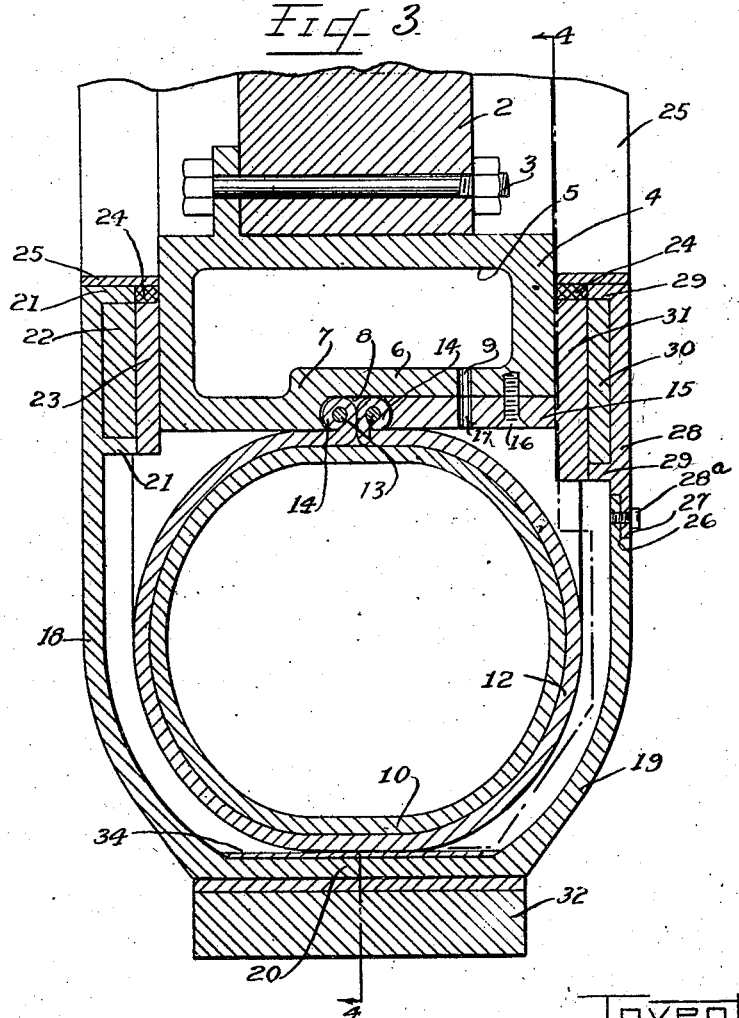
Inventor
Ralph Rogers Mundell
by
Attys.

Patented Sept. 21, 1926.

1,600,694

UNITED STATES PATENT OFFICE.

RALPH ROGERS MUNDELL, OF CHICAGO, ILLINOIS.

TIRE CONSTRUCTION.

Application filed May 21, 1924. Serial No. 714,784.

This invention relates to an inner tube for use in an improved metal casing having a solid rubber tread and slidable with respect to a hollow rim member attached to a wheel felly and having the inner tube attached thereto, thereby producing a tire having the advantages of both a solid tire and a pneumatic tire.

It is an object of this invention to provide a wheel having a metal tire casing carrying a solid rubber tread and cushioned by an improved canvas covered inner tube connected to a hollow rim member having a chamber communicating with the air chamber within the metal tire casing.

It is also an object of the invention to provide a wheel having a resilient or flexible tire casing supported upon a pneumatic cushion provided with a covering having teeth formed thereon for coaction with tooth members, formed within the tire casing, to obviate slippage between the cushion and said tire casing.

It is an important object of this invention to provide a simple and improved tire construction wherein a metal casing carrying a solid rubber tread has sliding engagement with a chambered rim and is cushioned against a covered inner tube constructed so that slippage between the rim and the covered inner tube is obviated.

With these and other objects in view which will become more apparent in the following description and disclosures, this invention comprises the novel mechanism and combinations hereinafter described and more particularly pointed out and defined in the appended claims.

In the accompanying drawings, which illustrate a preferred embodiment of this invention, and in which similar reference numerals refer to similar features in the different views:—

Figure 1 is a side elevation of a wheel equipped with a tire casing and inner tube embodying the principles of this invention.

Figure 2 is a plan view of the tire partly broken away showing an emergency rim in section.

Figure 3 is an enlarged transverse section taken on line 3—3 of Figure 1.

Figure 4 is a reduced section on line 4—4 of Figure 3.

Figure 5 is a fragmentary detail section taken on line 5—5 of Figure 2.

Figure 6 is a fragmentary section taken through a modified tire illustrating the interfitting arrangement between the tire casing and the inner tube covering.

Figure 7 is a fragmentary detail section taken on line 7—7 of Figure 6.

As shown on the drawings:

The reference numeral 1 indicates a vehicle wheel having a felly 2 to which is secured by means of bolts 3 or other suitable means, a flanged hollow metal rim 4 having a continuous air chamber 5 (Figure 3). The outer peripheral wall 6 of the hollow rim 4 is offset at 7 to afford a groove or recess 8. The outer peripheral rim wall 6 is provided with a plurality of ventilating passages or apertures 9.

Engaged around the hollow rim 4 is a rubber inner tube 10 adapted to be inflated by means of a valve 11. The inner tube 10 is enclosed in a canvas envelope or covering 12; the margins of which are bent or rolled around wire rings 13 to form beads 14 which seat in the groove 8. A metal retaining ring 15 is also seated in the groove 8 against the beads 14 and is secured to the hollow rim 4 by screws 16 or other suitable means. Ventilating apertures 17 are provided in the retaining ring 15 and register with the apertures 9 in the wall 6 of the hollow rim 4.

The inner tube 10 and its covering 12 are enclosed by a slidable or shiftable steel tire casing comprising side walls 18 and 19 integrally connected by a thread ring 20. A canvas liner 34 is secured on the inner peripheral surface of the tire casing tread ring 20. The tire casing wall 18 is wider than the wall 19 and has ring flanges 21 integrally formed on the inner side thereof to form a pocket within which a wooden ring 22 is seated flush with the inner edges of the flanges 21. A packing ring 23 of wood or bearing metal is positioned between the wooden ring 22 and one side of the hollow metal rim 4. A hard packing ring 24 is engaged around the inner periphery of the packing ring 23 and is held in place by a metal retaining ring 25 secured to one of the tire flanges 21.

The second tire casing wall 19 is not as wide as the casing wall 18 and is provided with a ring groove at 26 to receive seated therein a flange 27 integrally formed on a steel retaining ring 28. Bolts or screws 28ᵃ are used to hold the retaining ring 28 secured to the casing wall 19. Ring flanges 29 are integrally formed on the inner side of the retaining ring 28 and form a pocket or groove within which a wooden ring 30 is seated. A packing ring 31 of wood or bearing metal is positioned between the wooden ring 30 and one side of the hollow metal rim 4. A hard packing ring 24 is also engaged around the packing ring 31 and is held in place by a metal retaining ring 25 secured to one of the flanges 29 of the retaining ring 28. The retaining ring 28 thus serves to hold the metal casing in position on the hollow wheel rim 4 and encloses the pneumatic inner tube 10 and the tube covering 12.

A hard rubber tread 32 is secured to the tire tread ring 20 so that the improved tire construction embraces a hard rubber tread and a pneumatic inner tube cushioning arrangement.

Figure 2 is partly broken away and shows a Z-cross-sectioned emergency rim 33 which may be inserted in place as illustrated when the covered inner tube has been injured, so that movement between the metal casing and the hollow rim is prevented by the rim 33 thereby taking the load off of the covered inner tube and permitting the wheel to be used without the pneumatic cushioning effect.

Figures 6 and 7 illustrate a modification wherein the inner peripheral surface of the tire tread ring 20 has secured thereto a canvas liner 35 on which a plurality of spaced hard rubber ribs or teeth 36 are formed or secured. Hard rubber ribs or teeth 37 are also formed on the periphery of the inner tube canvas covering 38. The teeth 37 interfit with the teeth 36 so that creeping between the inner tube and the metal casing is obviated.

The improved metal casing may be readily engaged in position co-acting with the hollow rim 4 when the retaining ring 28 is removed and when the covered inner tube is not inflated. After the tire has been slipped into place the retaining ring 15 is first secured in place by the screws 16 holding the beads 14 of the inner tube covering seated in the rim groove 8 (Figure 3). The casing retaining ring 28 is then secured to the casing wall 19 and the inner tube is then inflated so that the canvas covering 12 will press against the canvas liner 34 of the casing sufficiently to reduce any creeping effect of the covered inner tube with respect to the liner 34. The registering passages 9 and 17 connect the rim chamber 5 with the interior of the metal casing and act as ventilators to let the air and moisture in the steel casing pass into and out of the hollow rim 4 when the wheel is rotating and the tire moves with respect to the hollow rim.

The tire may be easily removed from the rim 4 by letting the air out of the inner tube 10 and then removing first the outer retaining ring 28 and then the inner retaining ring 15 which hold the covered inner tube in position on the hollow rim 4.

I am aware that many details in the construction may be varied through a wide range without departing from the principles of this invention, and I therefore do not wish to limit the patent granted otherwise than necessitated by the prior art.

I claim as my invention:—

1. A tire construction comprising a hollow rim adapted to be secured to a wheel felly, a pneumatic inner tube engaged around the periphery of said hollow rim, a beaded covering for said inner tube, a retaining ring adapted to hold the beaded covering secured to the hollow rim, a metal casing enclosing the inner tube and the covering, and having sliding engagement with the hollow rim, packing between the metal casing and said hollow rim, a lining in said casing against which the inner tube covering is adapted to engage, and a solid rubber tread secured peripherally on the metal casing.

2. The combination with a hollow metal rim member adapted to be secured to a wheel felly, of a covered inner tube, a retaining ring for holding the covered inner tube secured to the hollow rim, and a metal casing enclosing the covered inner tube and having sliding engagement with the hollow rim.

3. The combination with a wheel and the felly thereof, of a hollow rim member secured thereto and having ventilating openings therein, a pneumatic inner tube, a canvas covering therefor, beads formed on said covering, a retaining ring secured to the rim and engaging said beads to hold the inner tube and the covering in place, a metal casing having sliding engagement with the hollow rim, a retaining ring removably secured to the casing and packing carried by the casing and the casing retaining ring.

4. A tire construction comprising a hollow rim having ventilating openings therein, a metal casing slidably engaged with the hollow rim, an inner tube in said casing, and a retaining ring secured to said hollow rim for holding the inner tube engaged to the hollow rim, said retaining ring having openings therein registering with the openings in said hollow rim.

5. A tire construction comprising a hollow rim formed with a peripheral groove, an inner tube, a covering therefor, beads formed on said covering, wires in said beads, a retaining ring secured to said hollow rim to hold the beads seated in the peripheral groove of said hollow rim, a casing enclosing said inner tube and the covering, packing members between the casing and said hollow rim, a lining in said casing adapted to be contacted by the inner tube covering, and a solid rubber tread secured around the periphery of said casing.

6. A tire construction comprising a hollow rim, a covered inner tube, means for holding the covered inner tube secured to the hollow rim, a metal casing enclosing the covered inner tube and having sliding engagement with the hollow rim, packings between the casing and said hollow rim, and interfitting members formed on said covered inner tube and in said casing to obviate creeping of the covered inner tube with respect to the casing.

7. A tire construction comprising a hollow rim having a groove therein, an inner tube, a covering therefor, beads formed on the inner periphery of the covering and seated in said rim groove, wires in said beads, a retaining ring secured in the rim groove against said beads, a metal casing enclosing the inner tube and said covering and having sliding engagement with the hollow rim, a retaining member secured to the casing, packing separating the hollow rim from said casing and from said retaining member, a solid rubber tread on the exterior of the casing, and interfitting means in said casing and on said inner tube cover to hold the tube against slippage with respect to the casing.

In testimony whereof I have hereunto subscribed my name.

RALPH ROGERS MUNDELL.